July 11, 1967
A. A. YACHUK
3,330,227
MOUNTING MEANS FOR A TRAY
Filed June 21, 1966
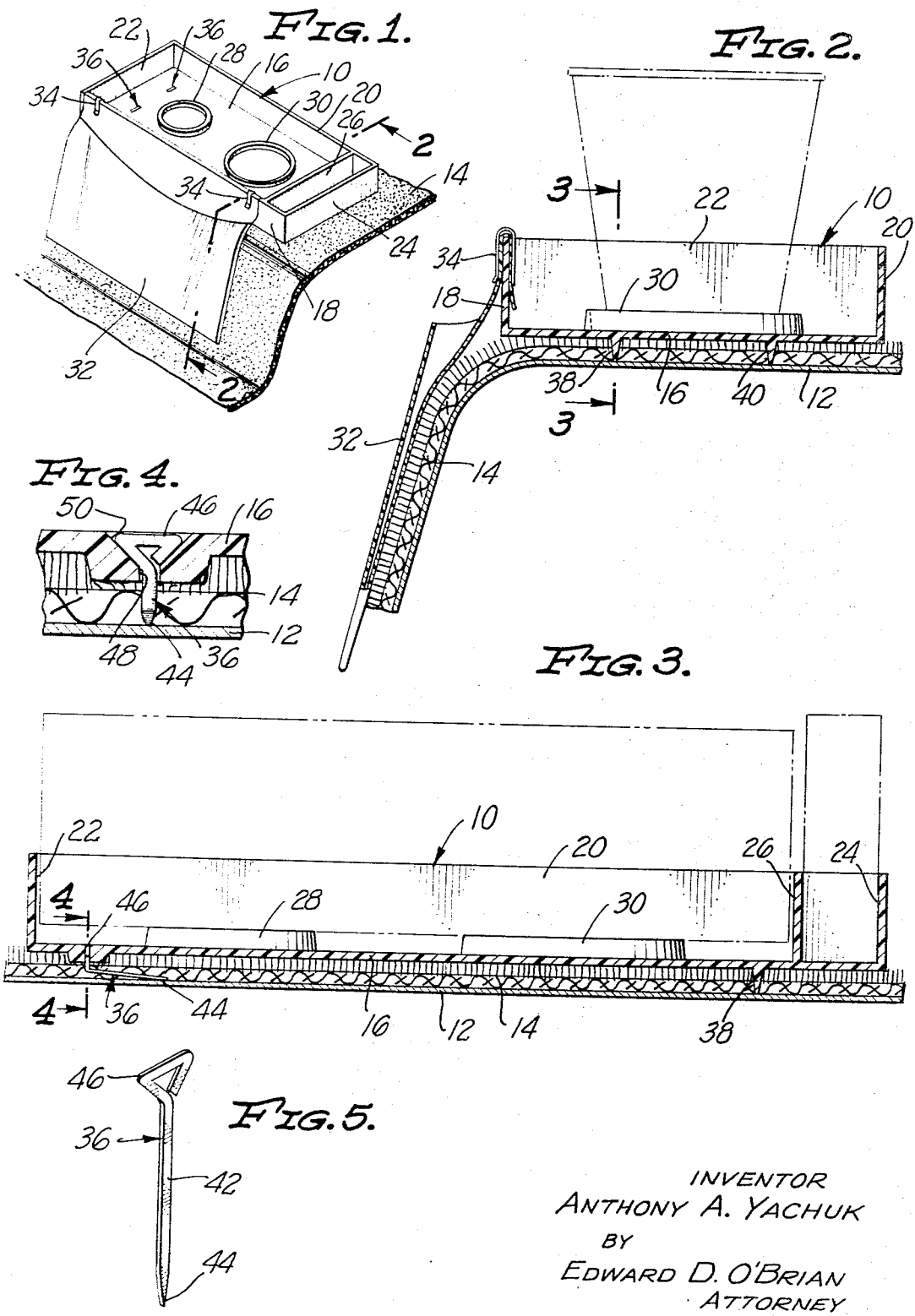
INVENTOR
ANTHONY A. YACHUK
BY
EDWARD D. O'BRIAN
ATTORNEY

United States Patent Office 3,330,227
Patented July 11, 1967

3,330,227
MOUNTING MEANS FOR A TRAY
Anthony A. Yachuk, 10012 Valley Blvd.,
El Monte, Calif. 91731
Filed June 21, 1966, Ser. No. 559,274
2 Claims. (Cl. 108—44)

ABSTRACT OF THE DISCLOSURE

A tray has side walls and suitable retention structure within the side walls to make it adaptable to hold articles within the tray. The tray is secured to a supporting surface, such as the floor of a car, by two sets of pointed members on the bottom of the tray. These pointed members engage the floormat of the automobile, or the like, in order to hold the tray against slippage. One set of these pointed members is perpendicular to the bottom of the tray to restrain the tray against lateral shifting. The other set lies at a close acute angle with respect to the bottom of the tray to hold the tray against lifting.

Summary

This invention is directed to the mounting structure used in mounting a tray, particularly for use in an automobile. The tray has a bottom, and the mounting structure comprises pointed members on the bottom of the tray for engagement into the floor mat of the automobile to achieve holding of the tray against slippage. The pointed holding members on the tray comprise at least one which is directed generally along the length of the bottom of the tray, and is positioned at a small acute angle with respect to the bottom of the tray. Another pointed member is secured to the bottom of the tray and is directed downward, away from the bottom of the tray. The acute angularly pointed member is adapted to be slid into the upholstery material in the automobile by longitudinal movement of the tray, while the downwardly directed pointed member is thereafter adapted to engage into the covering to prevent further longitudinal tray movement. Thus, the tray is relatively firmly held on the floor covering.

Background

Trays of various types are known for use in automobiles. Some of these have suction cups for mounting upon smooth, non-porous surfaces such as a dashboard. However, the presently available trays for mounting on the floor, or other upholstered portion of the car, are either permanently secured or are not properly secured against slippage. The mounting means of this invention overcomes the prior difficulties, and permits tray mounting upon the soft material of the automobile floor covering or upholstered areas within the car so that the tray is firmly mounted and detachably mounted without damage to the material upon which it is mounted. Thus, it is superior to prior structures.

Description

Accordingly, it is an object of this invention to provide a mounting means for a tray which is usable in automobiles so that the tray can be firmly mounted upon soft coverings within the automobile, such as floor covering or the upholstered areas. It is another object of this invention to provide mounting means for a tray, which mounting means permits rapid and firm engagement of the tray upon a covering in an automobile without appreciable damage to the covering. It is still another object of this invention to provide mounting means for a tray for use in automobiles, which mounting means permits quick removal of the tray so that it may be removed to provide space, or to be used in a different area. It is a further object of this invention to provide mounting means for a tray to be used in an automobile, which mounting means is re-usable so that new parts are not necessary between one mounting and the next of the tray within an automobile. Other objects and advantages of this invention will become apparent from a study of the following portion of this specification.

FIG. 1 is an isometric view of the tray with which the mounting means of this invention is associated.

FIG. 2 is an enlarged section taken generally along the line 2—2 of FIG. 1.

FIG. 3 is a section taken generally along the line 3—3 of FIG. 2.

FIG. 4 is an enlarged section taken generally along the line 4—4 of FIG. 3.

FIG. 5 is an isometric view of one of the pointed members forming part of the mounting means of this invention.

Referring now to the drawings, the tray incorporating the mounting means of this invention is generally indicated at 10. The tray 10 is adapted to be mounted upon any surface having a soft covering. For example, it is especially adapted to be mounted upon the transmission hump in an automobile near the center of the automobile just in front of the front seat. Such a hump is indicated at 12 and carries carpeting 14. While the carpeting 14 is illustrated as being a pile carpet, it will become apparent hereinafter that the mounting means for tray 10 is useful on any type of soft covering. For example, it is equally applicable to rubber floor mats, used in some automobiles, and to the upholstered areas such as the seat adjacent the driver. However, for other purposes describing this invention, hump 12 and carpet 14 will be described, it being clear that the tray 10 is mountable in other areas.

Tray 10 has a bottom 16, sides 18 and 20 and ends 22 and 24. Within the confines of the sides and the ends, cross piece 26 divides the interior of the tray so as to define two carrying areas within the tray. Preferably, these areas are such that the smaller one is of suitable size for the containment of a pack of cigarettes and the larger one is of suitable size for the containment of a box of paper handkerchiefs. To further increase the utility of the tray, the upper side of bottom 16 may carry retainer rings 28 and 30 which are adapted to carry cups therein to prevent their sliding motion. As a further utility for the tray 10, the litter bag 32 can be attached to side 18 by means of spring clips 34.

Tray 10 is mounted upon carpet 14 by means of pointed members 36, 38 and 40. As is seen in FIGS. 2 and 3, pointed members 38 and 40 are preferably integrally formed with bottom 16 and extend downward, at right angles to the bottom 16. Pointed members 38 and 40 are sufficiently sharp so as to penetrate carpet 14. By this penetration, they prevent motion of tray 10 in the plane of bottom 16.

One pointed member 36 is shown in the drawings. Either one of such pointed members may be used along the center line of the tray, or two may be used in line with the pointed members 38 and 40. In the present embodiment, two of such pointed members are used, for the one shown in the section of FIG. 3 is in line with pointed member 38. A similar one is positioned in line with pointed member 40. As is seen in FIG. 5, pointed member 36 has a shank 42 with a point 44 on its end. On the opposite end of shank 42 from point 44 is formed head 46. Head 46 is preferably triangular. Pointed member 36 is made of moderately hard material so that its point 44 is retained, but the material thereof is still sufficiently ductile that the shank 42 can be bent. As is best seen in FIG. 4, an opening 48 is located in the bottom 16 of tray 10 for each pointed member 36. The opening 48 is of sufficient size so that the shank 42 may be passed therethrough. Furthermore, at the top end of this opening and adjacent the top surface of bottom 16, recess 50 is provided to receive head 46. Head 46 is preferably triangular, as is indicated above, so that it may fit completely within recess 50. Preferably, shank 48 is rectangular so that recess 50 in opening 48 can be conveniently produced, and so that pointed member 36 has the maximum strength compatible with its requirements. After pointed member 36 is positioned through opening 48, and head 46 is completely within its recess, shank 42 is bent so that it is directed at a small acute angle with respect to bottom 16 and it points toward pointed member 38.

In use, after the pointed members 36 are inserted through their openings and are bent toward their respective pointed members 38 and 40, the tray 10 is ready for installation. The tray is positioned substantially where it is to be secured, the points 44 are engaged in carpet 14 and the tray 10 is moved endwise. As seen in FIG. 3, the tray is moved to the right so that the shanks 42 of members 36 are engaged in the carpet 14 to their full length up to the bend. Thereafter, the right end of the tray 10 is pushed down, as is seen in FIG. 3, so that the pointed members 38 and 40 engage into the carpet. In this position, the pointed members 38 and 40 prevent any lateral motion in the plane of bottom 16 while the pointed members 36 prevent lifting of that end of the tray as well as sideward motion thereof. The tray is then ready for use, and paper handkerchiefs, cigarettes, coffee cups or pop cans can be rested within tray 10. Furthermore, litter bag 34 is conveniently available for the placement of materials which are to be disposed of.

This invention having been described in its preferred embodiment, it is clear that it is susceptible to numerous modifications and embodiments within the scope of the routine artisan and without the exercise of the inventive faculty. Accordingly, this invention is defined by the scope of the following claims.

What is claimed is:
1. A tray adapted to be used in an automobile, said tray having side walls and having a substantially planar bottom, said tray having end walls and a cross wall positioned intermediate said end walls between the side walls of said tray so that two chambers are defined in said tray, said two chambers being of different size, a retaining ring secured to said bottom between said side walls in one of said chambers, said retaining ring being arranged to receive and restrain a cup, the improvement comprising:
   mounting means for said tray, said mounting means comprising a first pointed member extending downwardly away from said bottom substantially perpendicular to said bottom, a second pointed member extending from said bottom, an opening through said bottom, said opening extending through said bottom at substantially right angles with respect to said bottom, said second pointed member comprising a pointed metallic member extending downwardly through said opening, said pointed metallic member being bent adjacent the bottom of said tray to extend at a small acute angle with respect to said bottom of said tray;
   said first pointed member being arranged to engage in the floor carpet of an automobile to prevent lateral shifting of said tray and said second pointed member being positioned to engage in the floor carpet of an automobile to prevent lifting of said tray.
2. The tray of claim 1 wherein there are two of said first pointed members and two of said second pointed members extending from the bottom of said tray, said second pointed members comprising headed metallic pins engaged through two of said openings in said tray bottom.

References Cited

UNITED STATES PATENTS

| | | |
|---|---|---|
| 2,064,696 | 12/1936 | Smith, et al. |
| 2,082,577 | 6/1937 | Herschmann. |
| 2,853,220 | 9/1958 | Thomas _____ 248—216 X |
| 2,897,974 | 8/1959 | Cook. |
| 2,969,900 | 1/1961 | Heuler. |
| 2,986,438 | 5/1961 | Smathers, et al. |
| 3,109,537 | 11/1963 | Larkin. |
| 3,163,287 | 12/1964 | Barnett _____ 108—44 X |

DAVID J. WILLIAMOWSKY, *Primary Examiner.*

FRANK B. SHERRY, *Examiner.*

G. O. FINCH, *Assistant Examiner.*